(12) United States Patent
Yoo et al.

(10) Patent No.: US 10,546,034 B2
(45) Date of Patent: Jan. 28, 2020

(54) METHOD AND SYSTEM FOR EVALUATING RELIABILITY BASED ON ANALYSIS OF USER ACTIVITIES ON SOCIAL MEDIUM

(71) Applicant: CHUNGBUK NATIONAL UNIVERSITY INDUSTRY ACADEMIC COOPERATION FOUNDATION, Cheongju-si, Chungcheongbuk-do (KR)

(72) Inventors: Jaesoo Yoo, Cheongju-si (KR); Kyoungsoo Bok, Cheongju-si (KR); Jongtae Lim, Cheongju-si (KR); Jinkyung Yun, Daejeon (KR)

(73) Assignee: CHUNGBUK NATIONAL UNIVERSITY INDUSTRY ACADEMIC COOPERATION FOUNDATION, Cheongju-si, Chungcheongbuk-do (KR)

( * ) Notice: Subject to any disclaimer, the term of this patent is extended or adjusted under 35 U.S.C. 154(b) by 0 days.

(21) Appl. No.: 16/503,602

(22) Filed: Jul. 4, 2019

(65) Prior Publication Data

US 2019/0332637 A1  Oct. 31, 2019

Related U.S. Application Data

(63) Continuation-in-part of application No. 15/535,713, filed as application No. PCT/KR2015/014550 on Jun. 14, 2017, now abandoned.

(30) Foreign Application Priority Data

Sep. 18, 2015 (KR) .................. 10-2015-0132468

(51) Int. Cl.
G06F 16/951 (2019.01)
G06F 16/9536 (2019.01)
G06Q 50/00 (2012.01)

(52) U.S. Cl.
CPC ........ *G06F 16/9536* (2019.01); *G06F 16/951* (2019.01); *G06Q 50/01* (2013.01)

(58) Field of Classification Search
USPC .......................................... 705/7.29
See application file for complete search history.

(56) References Cited

U.S. PATENT DOCUMENTS 8,600,858 B1  12/2013  Kamruddin
8,601,059 B2  12/2013  Chan
(Continued)

FOREIGN PATENT DOCUMENTS

KR  10-2012-0096335 A  8/2012
KR  10-2014-0096411 A  8/2014
KR  10-2015-0033768 A  4/2015

OTHER PUBLICATIONS

Bok, K., Yun, J., Kim, Y., Lim, J., & Yoo, (2017) User reputation computation method based on implicit ratings on social media. KSII Transactions on Internet and Information Systems, 11(3), 1570-1594. available at doi:http://dx.doi.org/10.3837/tiis.2017.03.018 (Year: 2017).*

(Continued)

*Primary Examiner* — Folashade Anderson
(74) *Attorney, Agent, or Firm* — Revolution IP, PLLC (57) ABSTRACT

Disclosed are a method of evaluating reliability of information in a social media service includes calculating an evaluation score of information provided by an information provider on the basis of a social activity of each of a plurality of information consumers relating to the information, and calculating a reputation score of the information provider in a category of the information on the basis of the category and the evaluation score of the information.

6 Claims, 3 Drawing Sheets

(56) References Cited

U.S. PATENT DOCUMENTS

| | | | |
|---|---|---|---|
| 8,793,255 B1 | 7/2014 | Bilinski | |
| 2008/0120411 A1* | 5/2008 | Eberle | G06Q 50/10 709/225 |
| 2010/0257183 A1 | 10/2010 | Kim et al. | |
| 2012/0209832 A1 | 8/2012 | Neystadt | |
| 2014/0156758 A1 | 6/2014 | Lavian | |
| 2015/0095320 A1 | 4/2015 | Motte et al. | |
| 2018/0060434 A1* | 3/2018 | Fu | G06F 16/00 |

OTHER PUBLICATIONS

International Search Report for PCT/KR2015/014550 dated May 30, 2016 from Korean Intellectual Property Office.

Christensson, P. (Aug. 1, 2014). Field Definition. Retrieved Jan. 3, 2019, from https://techterms.com (Year: 2014).

Josang, A., Ismail, R. and Boyd, C. (2007) A survey of trust and reputation systems for online service provision. Decision Support Systems 43(2):pp. 618-644. Retrieved Jan. 4, 2019, from http://eprints.quledu.au/7280/1/7280.pdf (Year: 2007).

* cited by examiner

User Reputation UR

FIG 5

METHOD AND SYSTEM FOR EVALUATING RELIABILITY BASED ON ANALYSIS OF USER ACTIVITIES ON SOCIAL MEDIUM

CROSS REFERENCE TO PRIOR APPLICATION

This application is a Continuation-In-Part Applications of U.S. patent application Ser. No. 15/535,713 filed on Jun. 14, 2017, which is a National Stage Application of PCT International Patent Application No. PCT/KR2015/014550 filed on Dec. 31, 2015, under 35 U.S.C. § 371, which claims priority to Korean Patent Application No. 10-2015-0132468 filed on Sep. 18, 2015, which are all hereby incorporated by reference in their entirety.

BACKGROUND

The present invention relates to a method and system for a social network service, and more particularly, to a method and system for evaluating reliability on the basis of an analysis of user activities on a social medium.

Recently, with the development of Internet technology and mobile devices, communication between users has increased, and social media services have developed as fields of communication. The Internet technology makes it possible to quickly access a social media service through a mobile device or a web and rapidly and conveniently generate and access information, and the development of mobile devices enables a user to access a social media service any time anywhere. Social media services have recently been under active development as means for producing, consuming, and sharing information, and the number of users of social media services is rapidly increasing. While media, such as a newspaper, a magazine, a television (TV), a radio, and the like are used by information producers to unilaterally deliver information to information consumers, social media services are bilateral communication media in which a user is an information provider and an information consumer at the same time. In social media services, since users can produce, process, and share information in person and processes thereof are simple and convenient, information rapidly proliferates. Due to these characteristics, many users are using social media services. Also, since it is easy to access social media services through a mobile device, social media services are being used regardless of time and place, and production and exchange of information through the services are becoming routine.

Social media services may include a blog service for creating content from a user's thought, opinion, daily life, etc. and combining the created content in an Internet space, Wikipedia, which is collective intelligence of people from all walks of life, a social network service (SNS) for freely communicating and sharing information among users and establishing a connection between users, a user-created content (UCC) service, a micro-blog service, and the like.

Since social media services have become fields of active information exchange due to the easy production and rapid proliferation of information, social media services have an advantage in that it is possible to acquire much information in a short time. Together with this advantage, social media services have a problem in that unreliable information proliferates. Due to anonymity and a characteristic that anyone can easily and freely generate information, social media services have a disadvantage in that a malicious provider can easily generate and rapidly proliferate uncertain information.

For this reason, a countless number of pieces of unreliable information are proliferated thoughtlessly on the basis of social media services. Therefore, to solve the problem of uncertain or unreliable information being shared through social media services, a method of determining reliability and professionalism of information distributed through social media services is required.

Information distributed through social media services includes information produced by a user with low reliability, information shared among users, information maliciously produced by a particular user, and the like. Therefore, determining reliability of a provider of information that is distributed through social media services is required. Also, when a user is not an expert, unverified information may be provided through a social media service, and thus an evaluation method in which professionalism of information or professionalism of an information provider is taken into consideration is necessary.

Research has continuously been conducted on a technique for measuring reliability of a user in a social network. An interaction, relationship type, and interest similarity (IRIS) technique determines reliability between users on the basis of the type of a relationship between the users, an evaluation score of interaction between the users, and similarity in interests of the users. A multimedia social network trust model (MSNTM) technique calculates reliability between users on the basis of similarity in hobbies between the users, an evaluation score of the information, and a reliability score of the information. A trust-relation social network (TRSN) technique evaluates reliability of a user on the basis of the number of users directly connected to the user and similarity between user profiles.

SUMMARY

The present invention is directed to providing a method of evaluating reliability on the basis of an analysis of user activities on a social medium.

The present invention is directed to providing a system for evaluating reliability on the basis of an analysis of user activities on a social medium.

One aspect of the present invention provides a method of evaluating reliability of information in a social media service, the method including: calculating an evaluation score of information provided by an information provider based on a social activity of each of a plurality of information consumers relating to the information; and calculating a reputation score of the information provider in a category of the information based on the category and the evaluation score of the information.

Meanwhile, the evaluation score may be determined based on a final implicit evaluation score of the information and a final explicit evaluation score of the information, the final implicit evaluation score may be determined based on a social activity of at least one implicit information consumer who has performed an implicit evaluation on the information as the social activity among the plurality of information consumers, and the final explicit evaluation score may be determined based on a social activity of at least one explicit information consumer who has performed an explicit evaluation on the information as the social activity among the plurality of information consumers.

Also, the social activity of the at least one implicit information consumer may include a positive implicit evaluation or a negative implicit evaluation of the information, the positive implicit evaluation may be classified as an active positive implicit evaluation or a passive positive implicit evaluation in consideration of whether the social activity is active, and the negative implicit evaluation may be classified as an active negative implicit evaluation or a passive negative implicit evaluation in consideration of whether the social activity is active.

Also, the final implicit evaluation score $I_{ct_n}$ may be calculated according to equations below:

$$I_{ct_n} = d + (1-d) \cdot \frac{PI_{ct_n} + NI_{ct_n}}{n(I)} \qquad \langle\text{Equation}\rangle$$

$$PI_{ct_n} = \sum_{i=1}^{n_{PI}} PI_i^{ct_n}$$

$$NI_{ct_n} = \sum_{i=1}^{n_{NI}} NI_i^{ct_n}$$

where $PI_{ct_n}$ is a sum of all of $n_{PI}$ positive implicit evaluation scores of the information, $NI_{ct_n}$ is a sum of all of $n_{NI}$ negative implicit evaluation scores of the information, n(I) is the number of implicit evaluations of the information, and d is a damping coefficient, the final explicit evaluation score may be calculated according to an equation below:

$$E_{ct_n} = \frac{1}{n_E} \cdot \sum_{i=1}^{n_E} E_i^{ct_n} \qquad \langle\text{Equation}\rangle$$

where $n_E$ is the number of explicit evaluations, and $E_{ct_n}$ is an average explicit $n_E$ evaluations of the information and has a range $E_{ct_n} \in [0, 1]$, and the evaluation score may be calculated according to an equation below:

$$ct_n = \alpha \cdot E_{ct_n} + \beta \cdot I_{ct_n} \qquad <\text{Equation}>$$

where each of $\alpha$ and $\beta$ is a weight, and a sum of $\alpha$ and $\beta$ is 1.

Also, the reputation score $UR_{C_N}$ may be calculated according to an equation below:

$$UR_{C_n} = \frac{1}{n} \sum_{i=1}^{n} ct_i^{C_N} \cdot \frac{n_r}{n_u} \qquad \langle\text{Equation}\rangle$$

where $n_u$ is the number of users of the social media service, $n_r$ is the number of the plurality of information consumers, $ct_n^{C_N}$ is an evaluation score of each of the information and other information belonging to the category, and n is the number of pieces of the information and the other information.

Another aspect of the present invention provides a system for evaluating reliability of information in a social media service, the system including a processor configured to calculate an evaluation score of information provided by an information provider based on a social activity of each of a plurality of information consumers relating to the information and calculate a reputation score of the information provider in a category of the information based on the category and the evaluation score of the information.

Meanwhile, the evaluation score may be determined based on a final implicit evaluation score of the information and a final explicit evaluation score of the information, the final implicit evaluation score may be determined based on a social activity of at least one implicit information consumer who has performed an implicit evaluation on the information as the social activity among the plurality of information consumers, and the final explicit evaluation score may be determined based on a social activity of at least one explicit information consumer who has performed an explicit evaluation on the information as the social activity among the plurality of information consumers.

Also, the social activity of the at least one implicit information consumer may include a positive implicit evaluation or a negative implicit evaluation on the information, the positive implicit evaluation may be classified as an active positive implicit evaluation or a passive positive implicit evaluation in consideration of whether the social activity is active, and the negative implicit evaluation may be classified as an active negative implicit evaluation or a passive negative implicit evaluation in consideration of whether the social activity is active.

Also, the final implicit evaluation score $I_{ct_n}$ may be calculated according to equations below:

$$I_{ct_n} = d + (1-d) \cdot \frac{PI_{ct_n} + NI_{ct_n}}{n(I)} \qquad \langle\text{Equation}\rangle$$

$$PI_{ct_n} = \sum_{i=1}^{n_{PI}} PI_i^{ct_n}$$

$$NI_{ct_n} = \sum_{i=1}^{n_{NI}} NI_i^{ct_n}$$

where $PI_{ct_n}$ is a sum of all of $n_{PI}$ positive implicit evaluation scores of the information, $NI_{ct_n}$ is a sum of all of $n_{NI}$ negative implicit evaluation scores of the information, n(I) is the number of implicit evaluations of the information, and d is a damping coefficient, the final explicit evaluation score may be calculated according to an equation below:

$$E_{ct_n} = \frac{1}{n_E} \cdot \sum_{i=1}^{n_E} E_i^{ct_n} \qquad \langle\text{Equation}\rangle$$

where $n_E$ is the number of explicit evaluations, and $E_{ct_n}$ is an average of $n_E$ explicit evaluations of the information and has a range $E_{ct_n} \in [0, 1]$, and the evaluation score may be calculated according to an equation below:

$$ct_n = \alpha \cdot E_{ct_n} + \beta \cdot I_{ct_n} \qquad <\text{Equation}>$$

where each of $\alpha$ and $\beta$ is a weight, and a sum of $\alpha$ and $\beta$ is 1.

Also, the reputation score $UR_{C_N}$ may be calculated according to an equation below:

$$UR_{C_N} = \frac{1}{n} \sum_{i=1}^{n} ct_i^{C_N} \cdot \frac{n_r}{n_u} \qquad \langle\text{Equation}\rangle$$

where $n_u$ is the number of users of the social media service, $n_r$ is the number of the plurality of information consumers, $ct_n^{C_N}$ is an evaluation score of each of the information and other information belonging to the category, and n is the number of pieces of the information and the other information.

A method and system for determining reliability on the basis of user activities on a social medium according to exemplary embodiments of the present invention can enable a more accurate determination of reliability of information in consideration of information consumers' implicit evaluations of the information and ensure reliability of information of a particular category provided by an information provider by categorizing the information and calculating category-specific reputation information of the information provider who provides the information.

DETAILED DESCRIPTION

In the following detailed description of the present invention, reference is made to the accompanying drawings that show various embodiments in which the present invention can be implemented. These embodiments are described in sufficient detail to enable those of ordinary skill in the art to practice the present invention. It should be understood that the various embodiments of the present invention, although different, are not necessarily mutually exclusive. For example, a particular feature, structure, or characteristic described in connection with one embodiment may be implemented within other embodiments without departing from the spirit and scope of the present invention. In addition, it should be understood that the location or arrangement of individual elements within each disclosed embodiment may be modified without departing from the spirit and scope of the invention. Therefore, the following detailed description is not to be taken in a limiting sense. The scope of the present invention is limited solely by the appended claims and their equivalents when appropriately described. In the drawings, like numerals refer to the same or similar functionality in several aspects.

Hereinafter, exemplary embodiments of the present invention will be described in detail with reference to the drawings.

Conventional research on reliability of information distributed through social media services involves evaluating reliability of users on the basis of profiles of the users, relationships between the users, and explicit evaluations. However, in an actual process of consuming and sharing information through social media services, explicit evaluations are relatively rarely made by users, and most users do not update their own profiles. Therefore, according to a conventional user reputation management technique for evaluating reliability of information distributed through conventional social media services, reliability is determined on the basis of explicit evaluation information of users. Consequently, it is not possible to evaluate reliability of content which does not have evaluation information and/or accurate reliability of a user.

In social media services, a large amount of information is generated, processed, and shared. In a process of generating and consuming information through a social media service, users can perform many social activities, such as content posting, replying, evaluating, reading, sharing, subscribing, clipping, recommending and the like. For example, early social network services provide social networks mainly for managing personal connections between users, and the users make connections with each other and only share information through the personal connections therein. Therefore, the users can obtain only limited information existing in the personal connections.

However, social media that are open online platforms in which it is possible to make a connection with another user and share information produced in various forms, such as text, image, audio, video, or the like with other people, and in which other users can join are being activated recently, and a large amount of information is being produced, reproduced, consumed, and shared through the social media. Therefore, in an online process of generating and exchanging information between users, interrelations and dependent relationships may be formed between an information provider and information consumers. Therefore, activities of generating and consuming information may be performed on the basis of an implicit relationship which is not exposed rather than on the basis of an explicit relationship formed through friend making or the like.

Therefore, a method of making an implicit evaluation by analyzing various social activities which are currently being performed on social media and applying the implicit evaluation to an evaluation and reliability of a user is necessary.

A method and system for evaluating reliability on the basis of an analysis of user activities on a social medium according to exemplary embodiments of the present invention disclose a reputation management technique for a new information provider in which implicit evaluations of information and an information provider are analyzed on the basis of social activities performed on a social medium. According to an exemplary embodiment of the present invention, implicit evaluations as well as explicit evaluations may be taken into consideration when reputation information of an information provider is generated. Reactions of information consumers to information may be generally classified into positive implicit evaluations, negative implicit evaluations, and positive/negative explicit evaluations. Each of the positive implicit evaluations and the negative implicit evaluations may be classified again into several levels according to assertiveness of evaluations of information consumers. A higher score may be given for a more active reaction of a user to each of the positive/ negative implicit evaluations, while a lower score may be given for a more passive reaction.

Reactions of information consumers may be scored to calculate an overall evaluation score of information, and reputation information of information providers may be generated on the basis of the overall evaluation score according to fields. To determine professionalism of information providers according to fields, reputation information may be separately determined according to the fields. Also, influence of an information provider according to the number of information consumers may be applied to generation of final reputation information of the information provider.

When a method of determining reliability on the basis of an analysis of user activities on a social medium according to an exemplary embodiment of the present invention is used, it is possible to solve a conventional reliability determination problem in that implicit evaluation information for an information provider is not taken into consideration, and professional information providers in a particular field are distinguished on the basis of reputation information of information providers subdivided according to fields so that reliability of information can be improved.

MODES OF THE INVENTION

Figure 1:
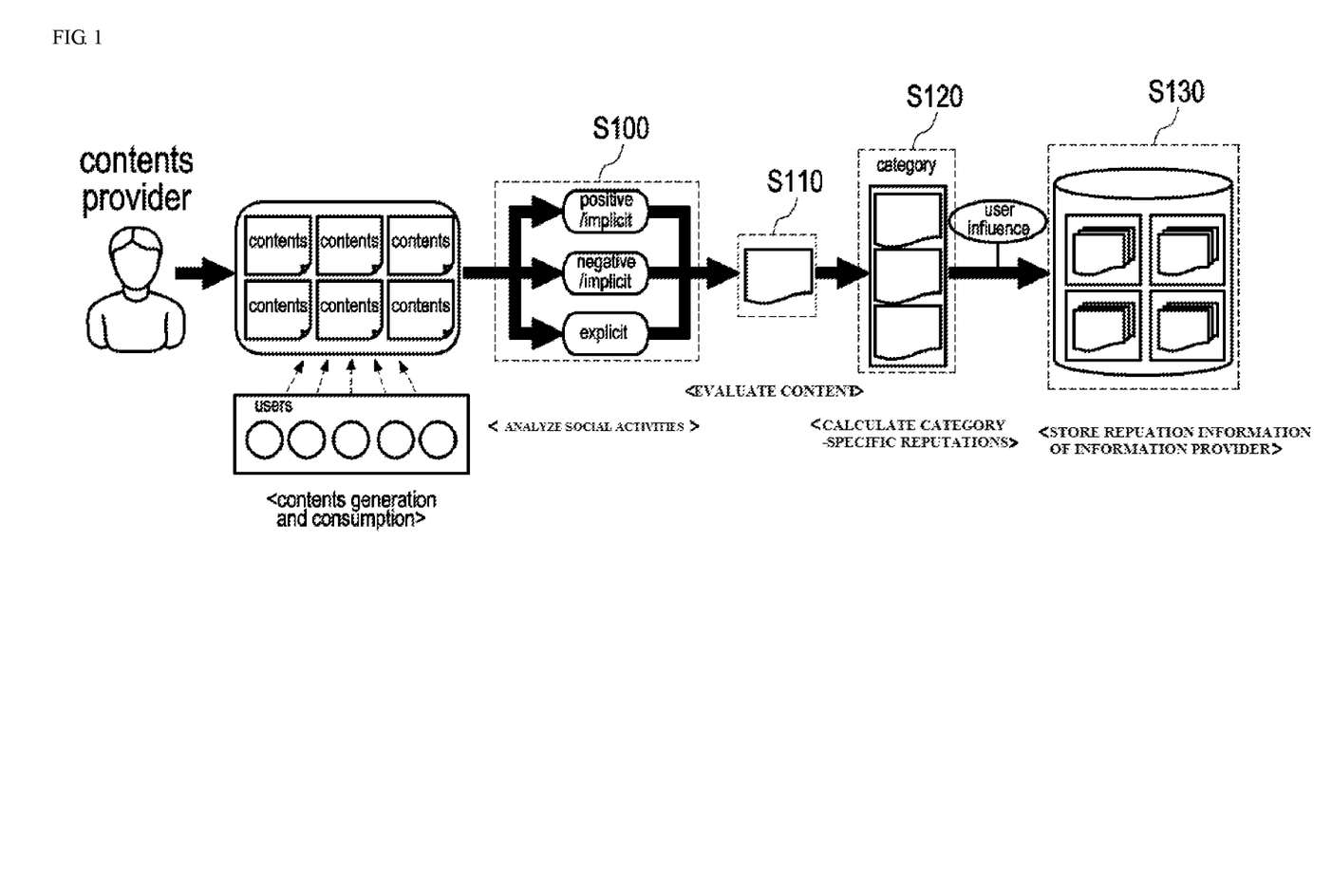
FIG. 1 is a conceptual view illustrating a method of determining reliability on the basis of an analysis of user activities on a social medium according to an exemplary embodiment of the present invention.

FIG. 1 is a conceptual view illustrating a method of determining reliability on the basis of an analysis of user activities on a social medium according to an exemplary embodiment of the present invention.

In current social media, information consumers may consume information in various ways. Such information consumption of information consumers in various ways may provide an environment appropriate to acquire an implicit evaluation of information provided by an information provider.

Since social media are open spaces for participation, even information consumers who have no explicit relationship with information providers can evaluate the information providers according to an activity of consuming information provided by the information providers. Evaluations of information made by information consumers who have no explicit relationship with an information provider may also be applied to reputation information of the information provider. In a method of determining reliability on the basis of an analysis of user activities on a social medium according to an exemplary embodiment of the present invention, implicit evaluations of information consumers may be taken into consideration on the basis of an analysis of information consumption activities of the information consumers performed on social media to generate reputation information of information providers according to fields. The reputation information of the information providers according to the fields may be used to evaluate field-specific professionalism of the information providers.

Finally, reputation of the information providers on social media can be managed in consideration of influence of the information providers.

Referring to FIG. 1, in a method of determining reliability on the basis of an analysis of user activities on a social medium according to an exemplary embodiment of the present invention, an information (or content) generation and consumption step is performed first. In the information generation and consumption step, an information provider may generate information (or content), and information consumers may consume the information (or content) generated by the information provider.

Next, a social activities analysis step (step S100) is performed.

In the social activities analysis step, reactions of the information consumers consuming the information generated by the information provider may be classified into positive implicit evaluations and negative implicit evaluations to acquire the information consumers' implicit evaluations of the information.

Each of the positive implicit evaluations and the negative implicit evaluations may be classified into an additional level by additionally considering assertiveness of the evaluations of the information consumers (e.g., an active evaluation, a passive evaluation, etc.). Evaluation activities of the information consumers may be classified into several levels, for example, an active positive implicit evaluation, a passive positive implicit evaluation, an active negative implicit evaluation, a passive negative implicit evaluation, and the like, according to whether the evaluation activities of the information consumers are active or passive. Information consumption activities of the information consumers are scored to determine evaluation scores of the information, and reputation information of the information provider may be generated.

When generating the reputation information of the information provider in connection with the information, it is not possible to exclude the information consumers' explicit evaluations of the information. Therefore, the explicit evaluations of the information consumers may also be taken into consideration together with the implicit evaluations to determine the reputation information of the information provider.

An information (or content) evaluation step (step S110) is performed.

An overall evaluation score of the information (content) may be calculated in consideration of both the implicit evaluations and the explicit evaluations of the information consumers.

A reputation computation-by-category step (step S120) is performed.

Field-specific reputation information of the information provider may be generated on the basis of the overall evaluation score of the information. Also, professionalism of the information provider may be evaluated by additionally considering influence of the information provider dependent on the number of the information consumers.

A step of storing the reputation information of the information provider (step S130) is performed.

The field-specific reputation information of the information provider may be finally stored as the reputation information of the information provider.

When the information provider generates information in a social medium, the information consumers may consume and share the information in various ways. The information consumers may consume the information according to quality of the information, preference for the information, and interest in the information, and may have various interactions with the information provider.

Figure 2:
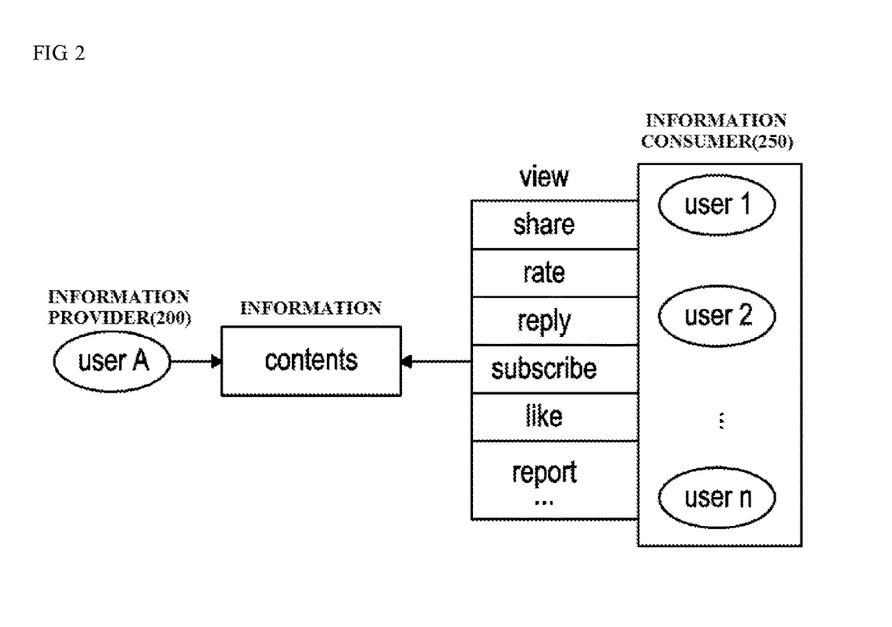
FIG. 2 is a conceptual view illustrating social activities between an information provider and information consumers on a social medium according to an exemplary embodiment of the present invention.

FIG. 2 is a conceptual view illustrating social activities between an information provider and information consumers on a social medium according to an exemplary embodiment of the present invention.

Referring to FIG. 2, an information provider 200 may provide information (or content), and information consumers 250 may perform implicit evaluations on information in various ways.

The information consumers 250 may express opinions about the information provided by the information provider with actions through social activities, such as viewing the information, providing notifications of liking the information, adding the information to a preferred list, sharing the information, and the like. In other words, social activities of the information consumers 250 on the information may be implicit evaluation activities of the information consumers 250 on the information.

An explicit evaluation of information is an evaluation of the information which clearly discloses an explicit numerical value, such as an evaluation rating or a star rating for the information.

Explicit evaluations are also meaningful elements for evaluating the information and determining reputation information of the information provider 200. However, most of the information consumers 250 do not participate in the evaluation, and an evaluation of the information and the reputation information of the information provider 200 may be maliciously generated by a malicious information consumer 250. To solve these problems, implicit evaluations may be performed on the information through an analysis of information consumption activities, social activities, or the like of the information consumers 250.

In a method of determining reliability on the basis of an analysis of activities of the information consumers 250 on a social medium according to an exemplary embodiment of the present invention, the social activities of the information consumers 250 may be classified and scored to perform implicit evaluations on information on the basis of social activities performed on the information by the information consumers 250.

The social activities may be generally classified into positive evaluations and negative evaluations. A score of a positive number may be given to a positive evaluation among the social activities, and a score of a negative number may be given to a negative evaluation among the social activities. An overall evaluation score of information may be determined by summing positive values acquired from all positive evaluations of particular information and negative values acquired from all negative evaluations of the particular information.

In addition, as described above, the positive evaluations may be classified in detail according to degrees of positivity thereof and the negative evaluations may be classified in detail according to degrees of negativity thereof. For example, after a positive evaluation is classified as an active positive evaluation or a passive positive evaluation, a relatively high positive score may be given to the active positive evaluation and a relatively low positive score may be given to the passive positive evaluation.

Likewise, after a negative evaluation is classified as an active negative evaluation or a passive negative evaluation, a relatively high negative score may be given to the active negative evaluation and a relatively low negative score may be given to the passive negative evaluation.

Table 1 below shows implicit evaluations according to social activities of information consumers.

TABLE 1

| Section | | Activity | Example | Score |
|---|---|---|---|---|
| Positive | Active ↕ Passive | Make a constant relation with content provider | Friend, subscribe | 1.0 |
| | | Share | Share | 0.75 |
| | | Positive comment, add to favorite list, link with short-length words | Positive comment, add to favorite list, tag | 0.5 |
| | | Express opinions with only clicks | Like | 0.25 |
| | | View, etc. | View | 0.1 |
| Negative | Active ↕ Passive | Make a constant non-relation with content provider, report | Block, report | −1.0 |
| | | Negative comment | Negative comment | −0.5 |
| | | Express opinions with only clicks | Dislike | −0.25 |

Referring to Table 1, information of an information provider may be evaluated through evaluation scores of the information resulting from social activities. A higher score may be given for a more active positive evaluation. A maximum value of 1.0 may be given to an activity of making a constant relationship with an information provider, and a value of 0.75 may be given when an information consumer widely shares content with others.

An activity of expressing a positive opinion regarding information with some words or keeping the information by adding the information to a preferred list is more passive than sharing in terms of information distribution and is just a short expression of opinion. Therefore, a medium score of 0.5 may be given thereto. A score of 0.25 may be given to an activity of simply expressing a positive opinion "like" regarding the information with a click. Finally, "view" is considered to be the most passive activity, and a score of 0.1 may be given thereto.

Among negative activities, "block" or "report" is an activity of viewing information and ending a relationship with an information provider who has generated the information or reporting spam or illegal content. Such a "block" or "report" activity is considered to be the most active activity among the negative activities, and a score of −1.0 may be given thereto.

Next, a negative comment is an activity of viewing information and expressing a negative opinion regarding the information with text, and thus a score of −0.5 may be given thereto. "Dislike" expresses a negative opinion with only one click and is thus considered to be the most passive activity among the negative activities, and a score of −0.25 may be given thereto.

Reputation information of users may be determined on the basis of explicit evaluations and such implicit evaluations of information which is generated to determine reputation information of the information provider 200. As described above, information may be evaluated on the basis of implicit evaluations and explicit evaluations. In the social activities analysis step, social activities relating to information may be classified into positive implicit evaluations, negative implicit evaluations, and explicit evaluations, and each of the social activities may be scored so that an overall evaluation of the information may be performed on the basis of the scores in an information evaluation step.

Figure 3:
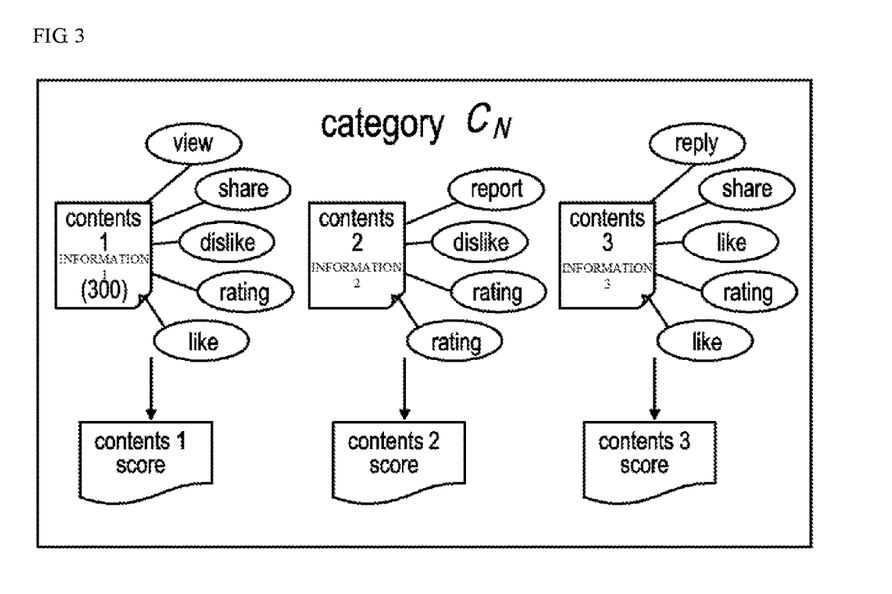
FIG. 3 is a conceptual view illustrating a process in which scores of pieces of information are derived from evaluation activities of information consumers according to an exemplary embodiment of the present invention.

FIG. 3 is a conceptual view illustrating a process in which scores of information are derived from evaluation activities of information consumers according to an exemplary embodiment of the present invention.

Referring to FIG. 3, information belongs to one category, and users may perform activities of consuming the information in various ways.

In relation to information 1 (300), information consumers' evaluation activities (or social activities), such as viewing, sharing, disliking, rating, and liking, are performed, and evaluation scores of the information may be calculated on the basis of the evaluation activities relating to the information.

Implicit evaluation scores of information may be separately calculated as positive implicit evaluation scores and negative implicit evaluation scores.

A final positive implicit evaluation score $PI_{ct_n}$ of information $ct_n$ is expressed as the sum of all of $n_{PI}$ positive implicit evaluation scores of the information $ct_n$. Therefore, the final positive implicit evaluation score $PI_{ct_n}$ the information $ct_n$ may be determined according to Equation 1 below.

$$PI_{ct_n} \sum_{i=1}^{n_{PI}} PI_i^{ct_n} \qquad \langle\text{Equation 1}\rangle$$

Likewise, a final negative implicit evaluation score $NI_{ct_n}$ of the information $ct_n$ may be calculated from individual negative implicit evaluation scores of the information. The final negative implicit evaluation score $NI_{ct_n}$ of the information $ct_n$ may be determined as the sum of all of $n_{NI}$ negative implicit evaluation scores of the information $ct_n$ according to Equation 2 below.

$$NI_{ct_n} = \sum_{i=1}^{n_{NI}} NI_i^{ct_n} \qquad \langle\text{Equation 2}\rangle$$

A final implicit evaluation score $I_{ct_n}$ of the information may be calculated on the basis of the final positive implicit evaluation score and the final negative implicit evaluation score. The final implicit evaluation score is calculated by giving a damping coefficient d to an implicit evaluation score. The damping coefficient is d and, for example, may have a value of 0.5. The damping coefficient may be used to map a value of $(PI_{ct_n}+NI_{ct_n})/n(I)$, which is calculated to be a range of [−1, 1], to a range of [0, 1].

Equation 3 below is an equation for calculating the final implicit evaluation score.

$$I_{ct_n} = d + (1-d) \cdot \frac{PI_{ct_n} + NI_{ct_n}}{n(I)} \qquad [\text{Equation 3}]$$

In Equation 3, n(I) is the number of implicit evaluations of the information, and $I_{ct_n}$ is the final implicit evaluation score of the information to which the damping coefficient is applied.

A final explicit evaluation score is a final result value of evaluation scores of the information which clearly indicate explicit numerical values, such as an evaluation rating, a star rating, or the like of the information. An explicit evaluation score $E_{ct_n}$ of the information $ct_n$ is the average of $n_E$ explicit evaluation scores of the information $ct_n$ and has the following range: $E_{ct_n} \in [0, 1]$, Therefore, a final explicit evaluation score of the information $ct_n$ may be calculated according to Equation 4 below.

$$E_{ct_n} = \frac{1}{n_E} \cdot \sum_{i=1}^{n_E} E_i^{ct_n} \qquad \langle\text{Equation 4}\rangle$$

In a method of determining reliability on the basis of an analysis of activities of information consumers on a social medium according to an exemplary embodiment of the present invention, both a final implicit evaluation score and a final explicit evaluation score of information may be taken into consideration to determine an overall evaluation score of the information.

Equation 5 below represents a final evaluation score of information which is calculated in consideration of both a final implicit evaluation score and a final explicit evaluation score of the information.

$$R_{ct_n} = \alpha \cdot E_{ct_n} + \beta \cdot I_{ct_n} \qquad \langle\text{Equation 5}\rangle$$

Referring to Equation 5, the final evaluation score may be calculated by giving weights $\alpha$ and $\beta$ to the final explicit evaluation score $E_{ct_n}$ and the final implicit evaluation score $I_{ct_n}$ of the information, respectively. The sum of the weights $\alpha$ and $\beta$ is 1.

The final evaluation score of the information calculated as described above may be used to determine reputation information of the information provider.

Figure 4:
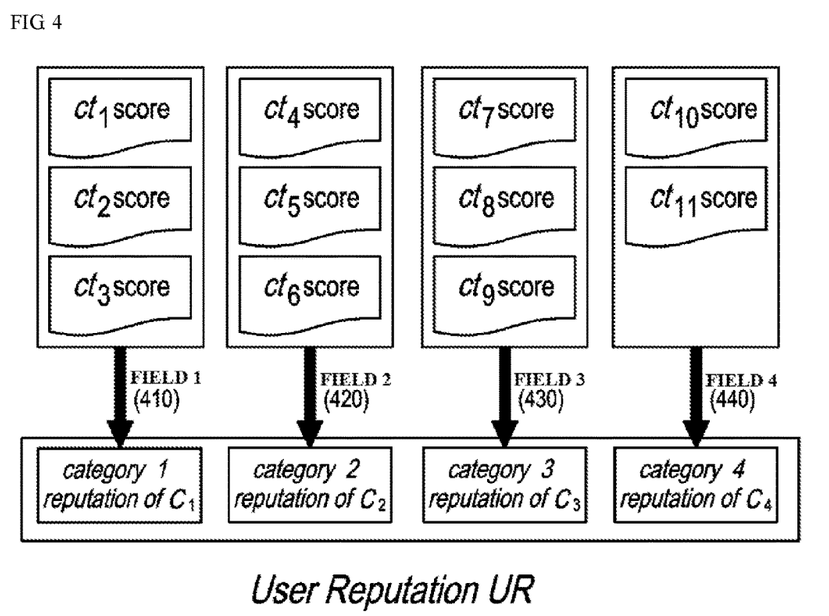
FIG. 4 is a conceptual view illustrating a method of determining an area of expertise of an information provider according to an exemplary embodiment of the present invention.

FIG. 4 is a conceptual view illustrating a method of determining an area of expertise of an information provider according to an exemplary embodiment of the present invention.

An information provider can hardly be an expert in all fields. For example, it is not possible to say that an information provider who shows high professionalism in the field of sports also shows high professionalism in the field of cooking. Therefore, for improved management of reputation information of information providers, it is necessary to subdivide reputation information of users according to fields.

To determine reliability of information provided by an information provider on a social medium, an area of expertise of the information provider may be determined. According to an exemplary embodiment of the present invention, information generated by the information provider may be grouped according to fields, and a final evaluation score of information belonging to a particular field may be calculated. The final evaluation score may be used to determine reputation information of the information provider in the particular field. The reputation information of the information provider in the particular field may determine reliability of information which is provided by the information provider in connection with the particular field.

Referring to FIG. 4, information 1, information 2, and information 3 are classified into field 1 (410), and a reputation score of an information provider in the field 1 (410) may be calculated on the basis of evaluation scores of the information 1, the information 2, and the information 3.

Information 4, information 5, and information 6 are classified into field 2 (420), and a reputation score of the information provider in the field 2 (420) may be calculated on the basis of evaluation scores of the information 4, the information 5, and the information 6.

Information 7, information 8, and information 9 are classified into field 3 (430), and a reputation score of the information provider in the field 3 (430) may be calculated on the basis of evaluation scores of the information 7, the information 8, and the information 9.

Information 10 and information 11 are classified into field 4 (440), and a reputation score of the information provider in the field 4 (440) may be calculated on the basis of evaluation scores of the information 10 and the information 11.

An evaluation score of each of the fields may determine evaluation information of the field.

Specifically, a reputation score of the information provider in a particular field may be calculated according to Equation 6 below.

$$UR_{C_N} = \frac{1}{n}\sum_{i=1}^{n} R_{ct_n}^{C_N} \cdot \frac{n_r}{n_u} \quad \langle \text{Equation 6} \rangle$$

Referring to Equation 6, an evaluation score of at least one piece of information $R_{ct_n}^{C_n}$ belonging to a particular field $C_N=\{C_1, C_2, C_3, \ldots\}$ is calculated, and the reputation score of the information provider in the particular field may be calculated on the basis of an average of evaluation scores of information classified into the particular field. The number of pieces of information belonging to the particular field may been.

Also, considering that an information provider who has a larger number of evaluators is a more influential information provider, the number of information consumers who have evaluated the information provider may be applied to a calculation of the reputation score of the information provider. In Equation 6, $n_u$ is the number of users of a social media service and $n_r$ is the number of information consumers. The reputation score $UR_{C_N}$ of information provider in the particular field may be calculated on the basis of a value obtained by dividing the number $n_r$ of information consumers by the number $n_u$ of users of the social media service.

Figure 5:
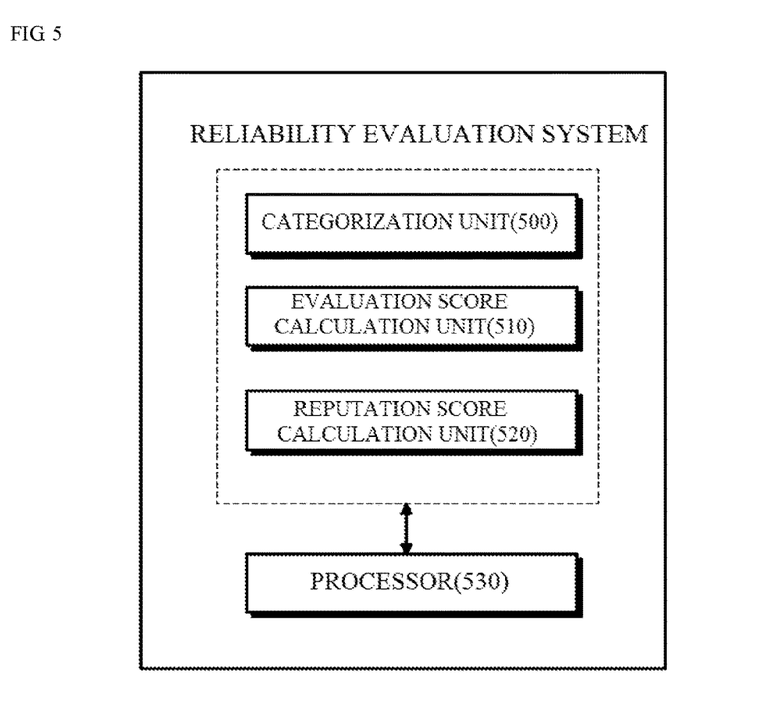
FIG. 5 is a block diagram of a system for evaluating reliability of information in a social media service according to an exemplary embodiment of the present invention.

FIG. 5 is a block diagram of a system for evaluating reliability of information in a social media service according to an exemplary embodiment of the present invention.

FIG. 5 shows a reliability evaluation system that calculates an evaluation score of information in a social media service and calculates a reputation score of an information provider in a particular category in consideration of the evaluation score of the information and a category of the information. The reliability evaluation system may include a categorization unit 500, an evaluation score calculation unit 510, a reputation score calculation unit 520, and a processor 530. The reliability evaluation system may perform the method of determining reliability on the basis of an analysis of user activities on a social medium described above with reference to FIGS. 1 to 4. For example, the components may perform the following operations.

The categorization unit 500 may be used to categorize information. According to an exemplary embodiment of the present invention, reputation scores of an information provider may be calculated according to categories. Information provided by an information provider may be categorized to calculate category-specific reputation scores of the information provider.

The evaluation score calculation unit 510 may be implemented to calculate an evaluation score of the information in consideration of information consumers' explicit evaluations and implicit evaluations of the information. As described above, the implicit evaluations may be classified into active positive implicit evaluations, active negative implicit evaluations, passive positive implicit evaluations, and passive negative implicit evaluations in consideration of positivity, negativity, activity, and passivity of the evaluations based on social activities of users. An active positive implicit evaluation, an active negative implicit evaluation, a passive positive implicit evaluation, and a passive negative implicit evaluation may have different evaluation scores.

The reputation score calculation unit 520 may calculate a reputation score of the users in a category corresponding to the category of the information on the basis of the evaluation score of the information. The reputation score may be determined by additionally considering the number of information consumers who have consumed the information provided by the information provider.

The processor 530 may be implemented to control operation of each of the categorization unit 500, the evaluation score calculation unit 510, and the reputation score calculation unit 520.

The processor 530 evaluates the reliability of the information by comparing the calculated reputation score with a predetermined reference score, and if the information is evaluated to be reliable, that is, if the calculated reputation score is higher than the predetermined reference score, the processor 530 allows access to the information and alternatively, if the information is evaluated to be unreliable, that is, if the calculated reputation score is lower than the predetermined reference score, the processor 530 blocks access to the information. As such, if the information is reliable, the user can access the information. Conversely, if the information is unreliable, the user is blocked from accessing the information.

In addition, the processor 530 may inform the user of the calculated reputation score and the reliability of the information. The user may identify the reputation score and the reliability of the information, and then selectively access the information evaluated as unreliable.

Such a method of determining reliability on the basis of an analysis of user activities on a social medium may be implemented as an application or in the form of program instructions that can be executed through various computer components and may be stored in a computer-readable recording medium. The computer-readable recording medium may include program instructions, data files, data structures, or the like solely or in combination.

The program instructions stored in the computer-readable recording medium are designed and configured especially for the present invention or may be known to and used by those or ordinary skill in the art of computer software.

Examples of the computer-readable recording medium include magnetic media, such as a hard disk, a floppy disk, and a magnetic tape, optical media, such as a compact disc read-only memory (CD-ROM) and a digital versatile disc (DVD), magneto-optical media, such as a floptical disk, and hardware devices, such as a ROM, a random access memory (RAM), and a flash memory, that are specially constructed to store and execute program instructions.

Examples of the program instructions include high-level language code executable by a computer using an interpreter or the like as well as machine language code generated by a compiler. The hardware devices may be configured to function as one or more software modules to perform operations according to the present invention, and vice versa.

While the present invention has been described in detail above with reference to exemplary embodiments, those of ordinary skill in the art should appreciate that various modifications and variations can be made to the present invention without departing from the scope of the present invention as set forth in the following claims.

INDUSTRIAL APPLICABILITY

A method and system for evaluating reliability on the basis of an analysis of user activities on a social medium according to the present invention can be usefully applied to an application which may determine reliability of information more accurately in consideration of information consumers' implicit evaluations of the information and ensure reliability of information of a particular category provided by an information provider by categorizing the information and calculating category-specific reputation information of the information provider who provides the information.

The invention claimed is:

1. A computer implemented method of evaluating reliability of information in a social media service by comparing a reputation score with a predetermined reference score, the method comprising:
  calculating, by a processor, an evaluation score of information provided by an information provider based on a social activity of each of a plurality of information consumers relating to the information;
  calculating, by the processor, the reputation score of the information provider in a category of the information based on the category and the evaluation score of the information;
  evaluating, by the processor, the reliability of the information by comparing the calculated reputation score with the predetermined reference score; and
  allowing, by the processor, an access to the information in the social media service if the calculated reputation score is higher than the predetermined reference score as the information is reliable, and alternatively, blocking, by the processor, the access to the information in the social media service if the calculated reputation score is lower than the predetermined reference score as the information is unreliable,
  wherein the evaluation score is based on a final implicit evaluation score of the information and a final explicit evaluation score of the information,
  wherein the final implicit evaluation score is based on a social activity of at least one implicit information consumer who has performed an implicit evaluation on the information as the social activity among the plurality of information consumers,
  wherein the final explicit evaluation score is based on a social activity of at least one explicit information consumer who has performed an explicit evaluation on the information as the social activity among the plurality of information consumers,
  wherein the final implicit evaluation score $I_{ct_n}$ is calculated according to equations below:

$$I_{ct_n} = d + (1-d) \cdot \frac{PI_{ct_n} + NI_{ct_n}}{n(I)} \qquad \langle \text{Equation} \rangle$$

$$PI_{ct_n} = \sum_{i=1}^{n_{PI}} PI_i^{ct_n}$$

$$NI_{ct_n} = \sum_{i=1}^{n_{NI}} NI_i^{ct_n}$$

where $PI_{ct_n}$ is a sum of all of $n_{PI}$ positive implicit evaluation scores of the information, $NI_{ct_n}$ is a sum of all of $n_{NI}$ negative implicit evaluation scores of the information, n(I) is a number of implicit evaluations of the information, and d is a damping coefficient,
  the final explicit evaluation score is calculated according to an equation below:

$$E_{ct_n} = \frac{1}{n_E} \cdot \sum_{i=1}^{n_E} E_i^{ct_n} \qquad \langle \text{Equation} \rangle$$

where $N_E$ is a number of explicit evaluations, and $E_{ct_n}$ is an average of $n_E$ explicit evaluations of the information and has a range $E_{ct_n} \in [0,1,]$, and
  the evaluation score is calculated according to an equation below:

$$R_{ct_n} = \alpha \cdot E_{ct_n} + \beta \cdot I_{ct_n} \qquad \langle \text{Equation} \rangle$$

where each of α and β is a weight, and a sum of α and β is 1.

2. The method of claim 1, wherein the social activity of the at least one implicit information consumer includes a positive implicit evaluation or a negative implicit evaluation of the information,
  the positive implicit evaluation is classified as an active positive implicit evaluation or a passive positive implicit evaluation in consideration of whether the social activity is active, and
  the negative implicit evaluation is classified as an active negative implicit evaluation or a passive negative implicit evaluation in consideration of whether the social activity is active.

3. The method of claim 1, wherein the reputation score $UR_{C_N}$ is calculated according to an equation below:

$$UR_{C_N} = \frac{1}{n} \sum_{i=1}^{n} R_{ct_n}^{C_N} \cdot \frac{n_r}{n_u} \qquad \langle \text{Equation} \rangle$$

where $n_u$ is a number of users of the social media service, $n_r$ is a number of the plurality of information consumers, $R_{ct_n}^{C_n}$ is an evaluation score of each of the information and other information belonging to the category, and n is a number of pieces of the information and the other information.

4. A system for evaluating reliability of information in a social media service by comparing a reputation score with a predetermined reference score, the system comprising:
  a memory configured to store program instructions; and
  a processor in communication with the memory, the processor configured to
    calculate an evaluation score of information provided by an information provider based on a social activity of each of a plurality of information consumers relating to the information,
    calculate the reputation score of the information provider in a category of the information based on the category and the evaluation score of the information,
    evaluate a reliability of the information by comparing the calculated reputation score with the predetermined reference score, and
    allow an access to the information in the social media if the calculated reputation score is higher than the predetermined reference score as the information is reliable, and alternatively, block the access to the information if the calculated reputation score is lower than the predetermined reference score as the information is unreliable,
  wherein the evaluation score is based on a final implicit evaluation score of the information and a final explicit evaluation score of the information,
  wherein the final implicit evaluation score is based on a social activity of at least one implicit information consumer who has performed an implicit evaluation on the information as the social activity among the plurality of information consumers, wherein the final explicit evaluation score is based on a social activity of at least one explicit information consumer who has performed an explicit evaluation on the information as the social activity among the plurality of information consumers, wherein the final implicit evaluation score $I_{ct_n}$ is calculated according to equations below:

$$I_{ct_n} = d + (1-d) \cdot \frac{PI_{ct_n} + NI_{ct_n}}{n(I)} \quad \langle\text{Equation}\rangle$$

$$PI_{ct_n} = \sum_{i=1}^{n_{PI}} PI_i^{ct_n}$$

$$NI_{ct_n} = \sum_{i=1}^{n_{NI}} NI_i^{ct_n}$$

where $PI_{ct_n}$ is a sum of all $n_{PI}$ positive implicit evaluation scores of the information, $NI_{ct_n}$ is a sum of all of $n_{NI}$ negative implicit evaluation scores of the information, n(I) is a number of implicit evaluations of the information, and d is a damping coefficient, the final explicit evaluation score is calculated according to an equation below:

$$E_{ct_n} = \frac{1}{n_E} \cdot \sum_{i=1}^{n_E} E_i^{ct_n} \quad \langle\text{Equation}\rangle$$

where $n_E$ is a number of explicit evaluations, and $E_{ct_n}$ is an average of $n_E$ explicit evaluations of the information and has a range $E_{ct_n} \in [0,1]$, and the evaluation score is calculated according to an equation below:

$$R_{ct_n} = \alpha \cdot E_{ct_n} + \beta \cdot I_{ct_n} \quad <\text{Equation}>$$

where each of $\alpha$ and $\beta$ is a weight, and a sum of $\alpha$ and $\beta$ is 1.

5. The system of claim 4, wherein the social activity of the at least one implicit information consumer includes a positive implicit evaluation or a negative implicit evaluation on the information, the positive implicit evaluation is classified as an active positive implicit evaluation or a passive positive implicit evaluation in consideration of whether the social activity is active, and the negative implicit evaluation is classified as an active negative implicit evaluation or a passive negative implicit evaluation in consideration of whether the social activity is active.

6. The system of claim 4, wherein the reputation score $UR_{C_N}$ is calculated according to an equation below:

$$UR_{C_N} = \frac{1}{n} \sum_{i=1}^{n} R_{ct_n}^{C_N} \cdot \frac{n_r}{n_u} \quad \langle\text{Equation}\rangle$$

where $n_u$ is a number of users of the social media service, $n_r$ is a number of the plurality of information consumers, $R_{ct_n}^{C_n}$ is an evaluation score of each of the information and other information belonging to the category, and n is a number of pieces of the information and the other information.

\* \* \* \* \*